(12) United States Patent
Barbara

(10) Patent No.: US 7,826,635 B2
(45) Date of Patent: Nov. 2, 2010

(54) SYSTEM AND METHOD FOR IMPROVING ACCURACY OF SIGNAL INTERPRETATION

(76) Inventor: Justin Santa Barbara, 14 Ashley Gardens, Ambrosden Gardens, London SW1P 1QD (GB)

( * ) Notice: Subject to any disclaimer, the term of this patent is extended or adjusted under 35 U.S.C. 154(b) by 667 days.

(21) Appl. No.: 10/454,367

(22) Filed: Jun. 4, 2003

(65) Prior Publication Data

US 2004/0101198 A1    May 27, 2004

Related U.S. Application Data

(63) Continuation of application No. PCT/GB01/05580, filed on Dec. 17, 2001.

(51) Int. Cl.
*G06K 9/00*    (2006.01)

(52) U.S. Cl. .................................... 382/100

(58) Field of Classification Search ............... None
See application file for complete search history.

(56) References Cited

U.S. PATENT DOCUMENTS

| | | | |
|---|---|---|---|
| 3,271,738 A | | 9/1966 | Kamentsky |
| 4,809,189 A | * | 2/1989 | Batson ........................ 702/67 |
| 5,933,531 A | | 8/1999 | Lorie |
| 6,028,970 A | * | 2/2000 | DiPiazza et al. ............ 382/309 |
| 6,230,106 B1 | * | 5/2001 | Metzger ...................... 702/85 |
| 6,269,153 B1 | * | 7/2001 | Carpenter et al. ......... 379/88.02 |
| 6,295,391 B1 | * | 9/2001 | Rudd et al. ................. 382/313 |
| 6,690,420 B1 | * | 2/2004 | Liu ............................. 348/241 |

FOREIGN PATENT DOCUMENTS

| | | |
|---|---|---|
| EP | 0 435 349 | 7/1991 |
| EP | 0 680 035 | 11/1995 |

* cited by examiner

*Primary Examiner*—Brian Q Le

(57) ABSTRACT

An interpretation system for interpreting electronic signals. The system comprising a central processor for receiving an electronic signal from a user terminal; software for (a) interpreting the signal electronically to reduce errors and (b) identifying parts of the signal that cannot be accurately interpreted electronically. In the event that there are parts of the signal that cannot be interpreted, the system is operable to present at an operator terminal the part of the signal that cannot be accurately interpreted electronically. The operator terminal is such as to allow an operator to interpret the signal and make any corrections that are deemed necessary. Once this is done, the correct interpretation is sent to the user terminal or another pre-determined electronic destination. Also provided are means for automatically adapting the electronic signal-interpretation process when operator assisted interpretation is employed, so as to extend the range of signals that can be accurately interpreted electronically. In this way, the accuracy of the system is continuously and dynamically up-dated.

33 Claims, 7 Drawing Sheets

SYSTEM AND METHOD FOR IMPROVING ACCURACY OF SIGNAL INTERPRETATION

RELATED APPLICATIONS

This application is a continuation of International Application No. PCT/GB01/05580, which designated the United States and was filed Dec. 17, 2001 published in English, which claims priority to Great Britain Application No. 0104531.9 filed Feb. 23, 2001, and to Great Britain Application No. 0031596.0 filed Dec. 22, 2000. The entire teachings of the above applications are incorporated herein by reference.

BACKGROUND

Scanners are becoming increasingly useful tools in the modern office. They provide a fast and relatively efficient means for converting, for example, a printed document into an electronic version of the image. The captured electronic image can then be converted into text by software performing the process known as Optical Character Recognition (OCR). Limitations do, however, exist and documents that are subjected to the OCR process after scanning into a PC have to be closely checked by users for accuracy, despite recent advances in the technology.

Voice recognition software is also becoming more common and allows users to dictate text directly into a PC, which attempts automatically to convert the spoken words into an electronic version of the text. As with scanners, however, the voice recognition software available at present is limited in its usefulness, primarily because it is not yet sophisticated or intelligent enough to be able to eliminate errors.

Natural language processing systems aim to process text that is spoken or typed by a user in their native tongue and has to be translated either to another human language or to a machine-understood language (for the purpose of acting upon spoken commands). No effective way has yet been found to achieve this goal. Current systems achieve tolerable results by restricting the text that is recognised or severely restricting the area of conversation, or both.

An object of the present invention is to provide a system and method for providing corrected interpretations of electronic signals to users, which system and method are simple and cheap to implement, but highly effective. These interpretations may be the text that is present on the electronic image of a page; the text that is present in the electronic version of a sound; the meaning of a command that is present in an electronic version of a sound or text or a conclusion from a set of presented facts.

Various aspects of the present invention are defined in the accompanying independent claims. Some preferred features are defined in the dependent claims.

SUMMARY

The present invention relates to a system and method for improving accuracy of signal interpretation. In particular, the present invention relates to a system and method for improving text that is to be presented to a user, said text collected using scanning equipment or using voice recognition software. The invention also relates to a system and method for interpreting natural-language text, either allowing language translation or alternatively allowing the intention in natural-language text to be deduced. The invention also relates to a system and method for construction and development of expert systems.

According to one aspect of the present invention, there is provided an interpretation system comprising: means for receiving an electronic signal via a telecommunications system from a user terminal; processing means for interpreting the signal electronically; means for identifying parts of the text that cannot be accurately interpreted by the processing means; means for presenting the part of the text that cannot be accurately interpreted at an operator terminal means for allowing the operator to correct errors in the interpretation presented, and means for sending a signal including the interpreted text or a command based on the interpreted text to the user terminal or another pre-determined electronic destination.

An advantage of the system is that errors in the interpretation can be corrected at the operator terminal by third party human intervention in a fast and efficient manner and returned electronically to the desired location. This is done in a way that is entirely transparent to the user. Hence, all the user has to do is send, for example, text that he has dictated into voice recognition software to the system, which then checks the text for errors (including errors against the speech recording), makes corrections where appropriate and returns the correct text to the user in real time. This sending process may be automatic.

Means may be provided for automatically adapting the processing means when operator assisted interpretation is employed, so that the processing means is able to interpret signals that are identified by the operator, thereby to extend the range of signals that can be accurately interpreted electronically. In this way, the accuracy of the system can be continuously and dynamically up-dated.

The means for interpreting a signal including an image may comprise means for cleaning up the image to remove unwanted marks. The means for interpreting may comprise means for identifying a block, preferably a single character, within an image. In this context, a block is defined as a group of image pixels that are connected. Means may be provided for comparing the block with known blocks already stored in a library, thereby to identify the block. In the event that a block cannot be identified, the means for presenting may be configured to display at the operator terminal the unidentified block either alone or as part of a sequence of blocks, so that the operator is able to identify the block. Means may be provided for adding to the library of known blocks any block that is identified by the operator, so that the library is dynamically up-dated.

A signal may be derived from an electronic scanner that is operable to scan an image and optionally also provide an electronic version of the text. Alternatively, the signal may be derived from voice recognition software that is operable to record spoken words and convert those spoken words into electronic text.

Recording means may be provided for receiving and recording an audio version of spoken words in association with the electronic text. The operator terminal may be adapted to play back at least a part of the audio recording to allow the operator to compare what was said with that part of the signal that cannot be accurately interpreted, thereby to assist the operator to correct any errors in the interpretation.

The command may be operable to control equipment at the user location, such as domestic appliances.

According to another aspect of the present invention, there is provided a method of interpreting electronic signals comprising:

receiving the electronic signals via a telecommunications system from a user terminal;

processing the signal electronically to interpret it and reduce errors;

identifying parts of the signal that cannot be accurately interpreted;

presenting the part of the signal that cannot be accurately interpreted at an operator terminal;

correcting errors in the interpretation presented by allowing human intervention, and sending a further signal including the interpretation of the original signal to the user terminal or another pre-determined electronic destination.

Interpreting a signal including an image may involve cleaning up the image to remove unwanted marks. Interpretation may involve identifying a block, preferably a single character, within the image. The method may further involve comparing the block with known blocks already stored in a library, thereby to identify the block. In the event that a block cannot be identified, the step of presenting may involve displaying at the operator terminal the unidentified block either alone or as part of a sequence of blocks, so that the operator is able to identify the block, wherein any block that is identified by the operator is added to the library, so that the library is dynamically up-dated.

The signal may include text derived from voice recognition software that is operable to convert spoken words into electronic text and the step of receiving may involve receiving and recording an audio version of the spoken word in association with the electronic text. The method may further involve playing back at least a part of the audio recording to allow the operator to compare what was said with the part of the text that cannot be accurately interpreted, thereby to assist the operator to correct any errors in the interpretation.

The command that is sent to the user terminal may be operable to control equipment at the user location, such as domestic appliances.

According to a further aspect of the invention, there is provided a computer program, preferably on a data carrier or a computer readable medium, for controlling a method of interpreting electronic signals, the computer program comprising instructions for: receiving the electronic signals via a telecommunications system from a user terminal; processing the signal electronically to interpret it; identifying parts of the signal that cannot be accurately interpreted; presenting the part of the signal that cannot be accurately interpreted at an operator terminal; correcting errors in the signal presented by allowing human intervention, and sending a further signal including the interpretation or a command based on the interpretation to the user terminal or another pre-determined electronic destination.

BRIEF DESCRIPTION OF THE DRAWINGS

Various systems in which the invention is embodied will now be described by way of example only and with reference to the following drawings, of which.

DETAILED DESCRIPTION

Figure 1:
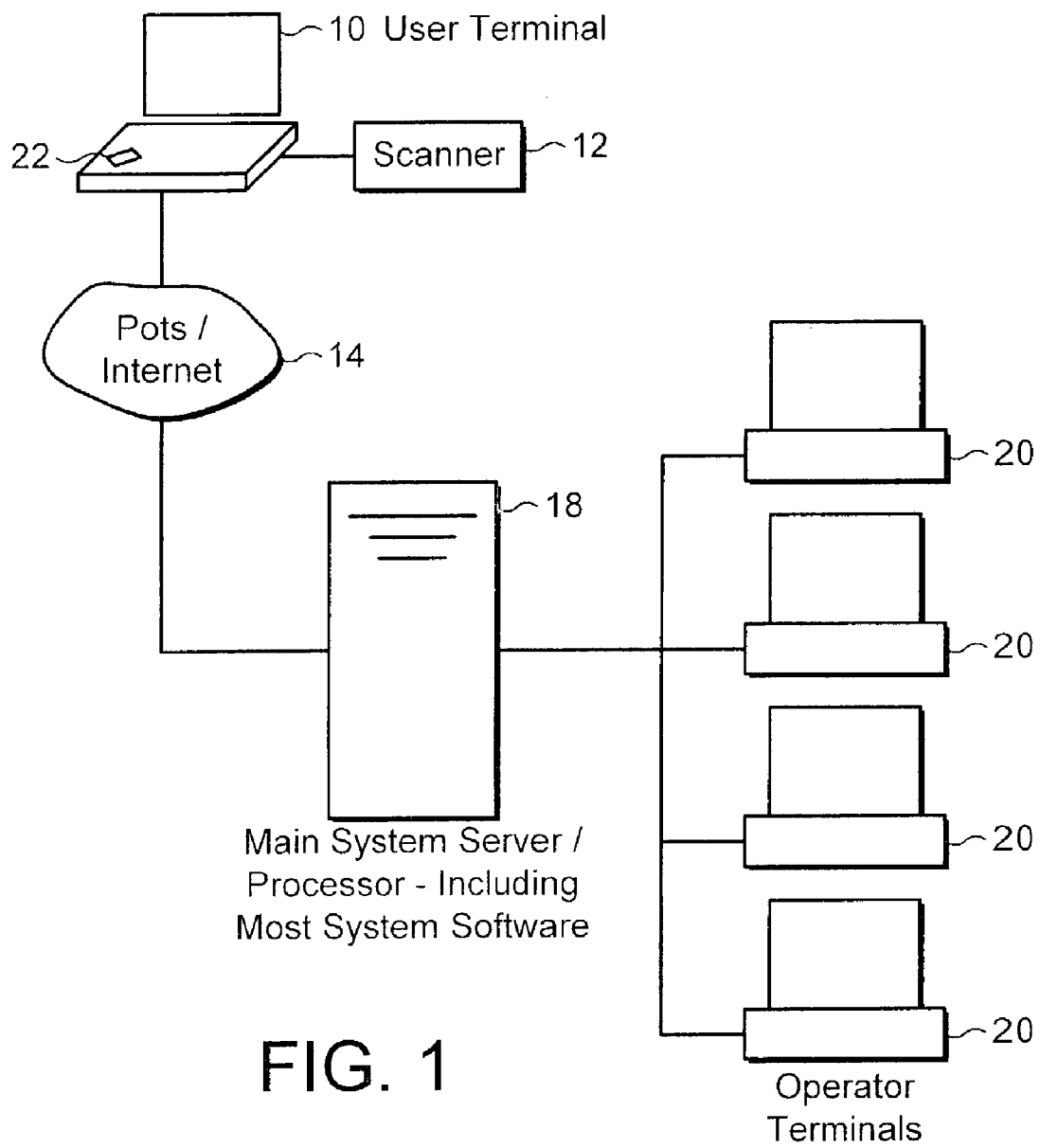
FIG. 1 is a block diagram of a first system, in which documents are electronically scanned and then submitted to a central server at a remote location for error correction.

FIG. 1 shows a user terminal 10 that has a scanner 12 for scanning text documents. The user terminal 10 can be connected via the internet 14 or any other suitable communication system, for example a dedicated secure connection, to a main server(s) 18 that is in turn connected to a plurality of operator terminals 20 that are manned by trained staff. Included in a processor 22 in the user terminal 10 is software that is operable to interpret incoming signals from the scanner 12 and automatically transmit the scanned image over the communication network to the main server 18. Included in the main server 18 are one or more service computers that have software for receiving, interpreting and correcting the incoming information from the user terminal 10. Also included in the main server 18 is software for transmitting at least part of the text and image of the document that is to be checked to a selected one of the manned operator terminals 20 for manual checking by the operator.

When an image is scanned on the end user's system 12, the image data is captured as a black and white image and corrected for skew by the scanner hardware/capture software. Many high-end scanners correct skew automatically. If the skew is not automatically corrected, a standard algorithm, which looks for the slope of the black edge of the paper can be used if the scanner captures this information (most high-end scanners do). Alternatively, other standard algorithms could be used or the user could be asked to manually de-skew the image. Submission of skewed images could be accepted in the system with an extra first step where images were de-skewed, optionally with human assistance in the case of uncertainty.

Once the image is scanned into the user's terminal 10, the user application causes the image to be automatically and transparently transmitted over the internet 14, or other communications network, ideally using a standard protocol such as FTP or HTTP to the main server 18. Also transmitted at this stage is a signal that indicates the nature of the service required (e.g. output format, quality of service) and an identification of the client (for billing and data return purposes). The end-user software ideally takes the form of a small downloadable application or Java applet or ActiveX control. Pre-scanned image files could also be submitted and the software would ideally expose an API so that other programs could make use of this accurate OCR facility.

The images received are placed into a queue for processing at the main server 18. Their queue entry is recorded in a database identifying the file and any meta-data, i.e. non-image information. Multiple queues could allow different is quality of services. The database then co-ordinates control of the remaining steps and allows for monitoring. One or more of the service computers assigned to perform initial optical character recognition (OCR) automatically checks the queue (s) and removes the highest priority entry (if any). The OCR process then begins.

Figure 2:
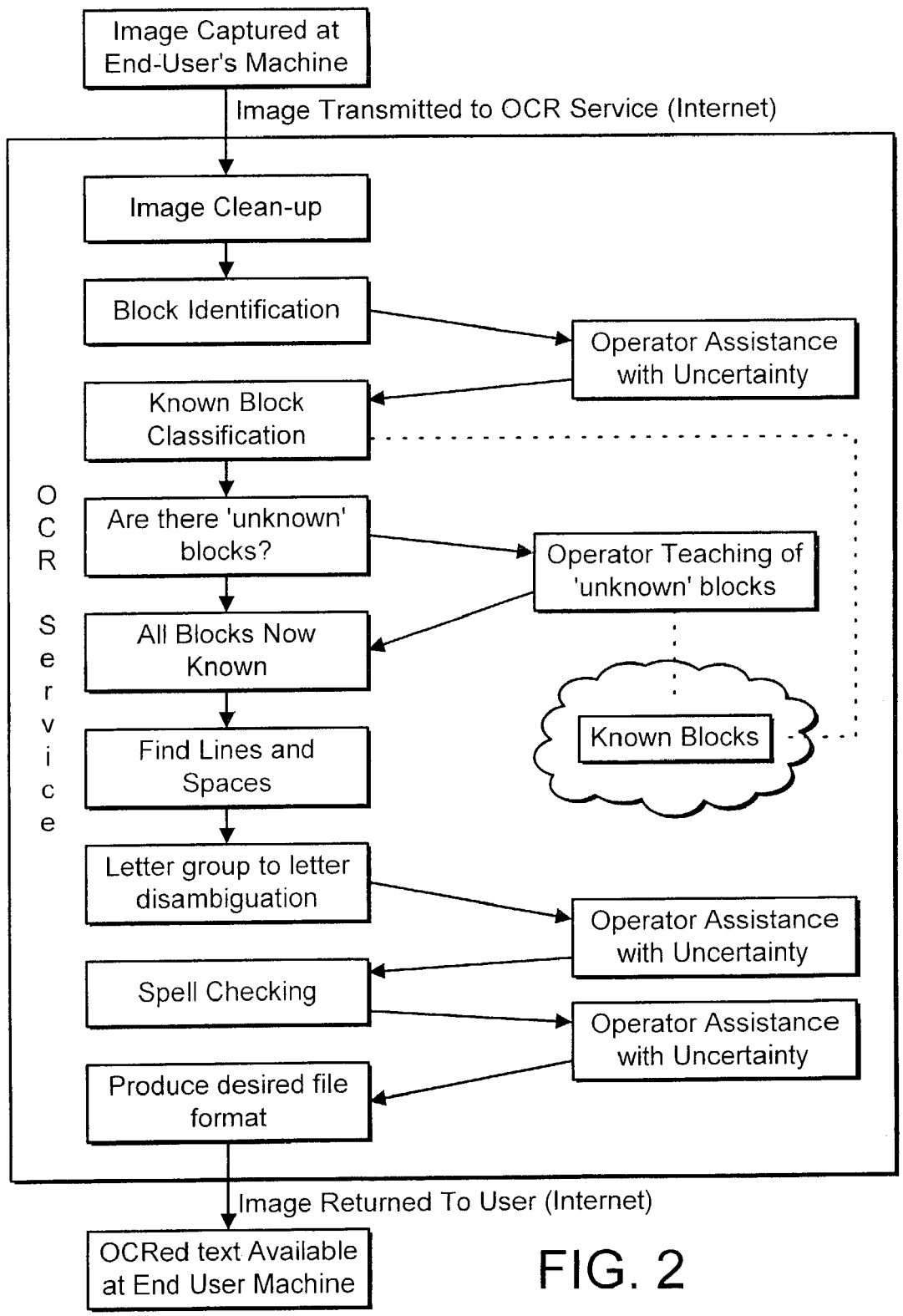
FIG. 2 shows process steps for using the system of FIG. 1.

FIG. 2 shows a flow diagram of the text identification process. The first step of the OCR process is started to identify connected black areas in the page image (blocks), which ideally comprise the individual letters. A prerequisite for the accuracy in the first step of block identification is to perform a clean up of the incoming image to remove 'problems' from the submitted image due to the original document or scanning process. There are many standard techniques for clean up of the image. The intention is to ensure that blocks are recognised accurately, i.e. that each letter in the document is mapped to exactly one block and that any problems are removed. In this way, the block 'looks' as similar to the perfect letter as possible (i.e. an 'e' on the image looks like an 'e'.).

The image clean-up technique in the current implementation makes an initial pass of the data before OCR takes place. This involves considering each pixel of the image and looking at its four "strong neighbours", i.e. the pixel above, the pixel below, the pixel to the right and the pixel to the left. If the majority, typically 3 or more, are black, the centre pixel is made black. If the majority, typically 3 or more, are white, the centre pixel is made white. If there is no majority, i.e. equal numbers of black and white, the centre pixel is unchanged. This image clean-up technique eliminates many 'stray' pixels that appear for instance when the image is too light and the scanner tries to darken it or when the background colour of the paper document is not white or when there are specks of dust on the image or scanner. It also clarifies the letter shapes and eliminates isolated pixels, i.e. pixels that are connected to no other pixels.

The next stage of the processing is the identification of blocks, which are groups of black pixels all connected to each other. A set of pixels is defined as a block if it either comprises a single black pixel or if it comprises a subset which is itself a block and a single new pixel which is connected by a "weak neighbour" to a pixel in the subset. A weak neighbour is any of the pixel's eight neighbours. This definition is equivalent to the following: a set of pixels is a block if it comprises a single black pixel and a set of pixels is a block if it comprises a group of subsets that are blocks and a single new pixel, which is connected by a "weak neighbour" to a pixel in every block in the group of subsets. Blocks can therefore be detected by scanning the image and considering each pixel in turn.

Typically, images are scanned across the top line and then the next line down from left to right, and so on to the bottom. As the image is scanned, black pixels are marked as being a block. Each time a new pixel is marked as a block, its neighbours are investigated and if any of them are marked as a block then the blocks are joined in accordance with the second inductive block definition. So if a neighbour is a block, the two blocks are combined. Even if a pixel is joined as a block with one of its neighbours, the other neighbours are checked in case this pixel is a 'bridge' between two existing blocks. Note that because of the definite scan order, only those neighbours that are above and to the left of each pixel need to be looked at, thus only four neighbours rather than the full eight need to be checked.

In order to avoid problems at the edge of the image (which does not have the full complement of neighbours), the submitted image is typically surrounded with a one-pixel white border. These white pixels never form a block, but their presence means that all the image pixels have the full eight neighbours.

In order to prune oversized blocks, heuristics are used to remove blocks that do not correspond to letters. This is necessary as the recognition of blocks will never in practice be perfect. Sometimes multiple letter pairs are recognized as a single block, for example, when they appear so close on the page that the scanner does not resolve the white space between them. Sometimes marks on the page that are defects of the original or defects introduced by the scanning process are recognized as blocks despite the fact that they are not letters.

Sometimes logos or pictures appear in the original and these are non-textual blocks. In addition, gridlines may appear as blocks. To conduct the pruning stage, a pruning algorithm is provided to attempt to eliminate those blocks that do not correspond to output text, while preserving all those that do.

The heuristics used consider the height and width of each block. In a first pass, 'large blocks' are removed, on the assumption that these are pictures, logos or lines. In the current implementation, blocks having a height/width that is more than ten times larger than the average block height/width are considered 'large blocks' and are removed. Optionally, a heuristic may be used at this stage to group blocks into rectangles that surround lines. To do this, the blocks are sorted by their top coordinate so that they can be considered from the top down. Once this is done, the first block is made a line and the line's rectangle is enlarged to include the next block, so long as the gap between the top of the new block and the bottom of the existing line region is less than ½ the average character height. It should be noted that this heuristic relies on accurate de-skewing of the image. Later, the character values determined are used to more accurately find the lines.

Even if all blocks are recognised perfectly, some letters will not be recognised uniquely as one block. The lower case letters i and j, the punctuation marks! and; and: and the double quote (") all contain two blocks that comprise one character. Before removing undersized blocks a block-joining process is performed to ensure that these 'dots' are not lost. In order to do this, blocks that overlap horizontally are joined, so long as they are close vertically. Typically the following size limitation gives good results: vertical distance less than ½ average block size. Lines are used to help narrow this search. To deal with double quotes, a search is conducted for blocks of small size that are close vertically and have only a small horizontal gap. Typically the following size limitations give good results: height less than ⅔ average height, width less than ½ average width, vertical misalignment less than ¼ of average height and horizontal gap less than ⅓ of average width.

Once the important small blocks are saved, those blocks that are less than four pixels or less (when scanned at a resolution of 300 dots per inch) in either dimension are removed. This is done because these are likely to be the result of scanning problems, and are judged to be unreadable anyway.

Based on the quality of service requested, the image may be sent to a review queue. A typical heuristic would be to send it for review if any large blocks were discarded or if the number of small blocks discarded exceed some threshold, say 50. Another heuristic could optionally review all those images that have large blocks and also select the worst 10% of a group of images in terms of number of small blocks discarded. Items from the front of this queue are presented to human operators so that they see the original image on the left hand side and the pruned image on the right hand side, with the differences (where blocks were discarded) drawn in a different colour (red works well). The operator is then able to inspect the text of both the original and the pruned version. The operator is able at this stage to amend or alter the block recognition. To this end, the software may be adapted to allow the user to click on a discarded block to mark it as being text that was incorrectly discarded or to mark it as an image that should be captured and returned to the user with the final text. For example, if the image selected by the user were a logo or a picture this could be highlighted as being for inclusion in the final text. This is the reason that a heuristic is provided to always review if a large block is discarded. The software is also adapted to allow the operator to click on blocks that were selected to remove them from consideration, e.g. a mark present in the original document (such as staple holes) not automatically recognised as such.

At this stage the image preparation is complete and a series of blocks have been identified that correspond to letters. Each block now has to be classified as a letter (or possibly letters). To do this, the output from the above process is sent to another queue, where it awaits the block classification process.

For the classification process, each block is considered in turn and is scaled to a standard size image. The aspect ratio of the original image is, however, preserved. At this stage a 16×16 grid is used, together with a 256 level grey-scale. The aspect ratio preservation means that an "o" fills the space while a "!" occupies only a small fraction of it horizontally, though all of it vertically, similarly a "–" occupies all the space horizontally though little of it vertically. The blocks are aligned so that they are centred within the grid. Each block is then compared with blocks in a dictionary of known pre-classified blocks. It should be noted that the dictionary is empty initially, but filled over time. The distance between each known block and the unknown block is then calculated using the following distance function:

$$\sqrt[4]{\frac{\sum\sum (x_{i,j} - a_{i,j})^4}{n}}$$

Where x and a are matrices for our two images, and n is the total number of entries in the matrix (here 256). Division by n normalises the choice of standard grid size.

This distance function is similar to the Euclidean distance, but has two key differences: (1) the space being considered has 256 dimensions, instead of 2 or 3 as is normal and (2) the exponent is 4 rather than 2. The choice of 4 as opposed to 2 penalises large differences more heavily than small differences. For instance, letters o and c are similar, but using a power of 4 rather than 2 puts a much higher weight on the right-hand gap in the c, where the o and the c differ completely. This makes the comparison more sensitive to a single large difference than to a multitude of small differences, which yields better results. Despite the differences, mathematically the distance operator given above shares most of the geometrical properties of the Euclidean metric in 2 or 3 dimensional space.

Having compared the block to the blocks in the dictionary of known blocks, the best match is determined, which is the block in the dictionary that is closest (has the smallest distance.) The block's best match must be less than a pre-determined distance threshold in order to accept the block as having the same value as its closest dictionary block. In the current implementation the threshold is set to 0.4, where each individual pixel value is scaled between 0 and 1. It is also necessary that the 'runner-up letter's score' (i.e. the different string which has the second best score) be more than a minimum number of times further away (the ratio test). The ratio requirement is preferably root 2 (1.414 . . . ). The ratio test means that even if a letter is a good match, if another is also a good match then the classification is not accepted.

There are some letters that are difficult to distinguish in this way, as they appear highly similar in certain fonts, e.g.:

I, 1, l, i (as i may be stripped of dot)
O, o, 0
P, p
C, c

-continued

W, w
V, v
S, s
X, x
Z, z
' and ,

These letters are considered as recognition groups for the ratio test, so that there is no failure to recognise an l (lower case L) simply because there is a 1 (one) in the dictionary, which is sufficiently close for the ratio test to fail. Hence, the best match is recorded within the group, but the result is treated with a degree of suspicion.

Figure 3:
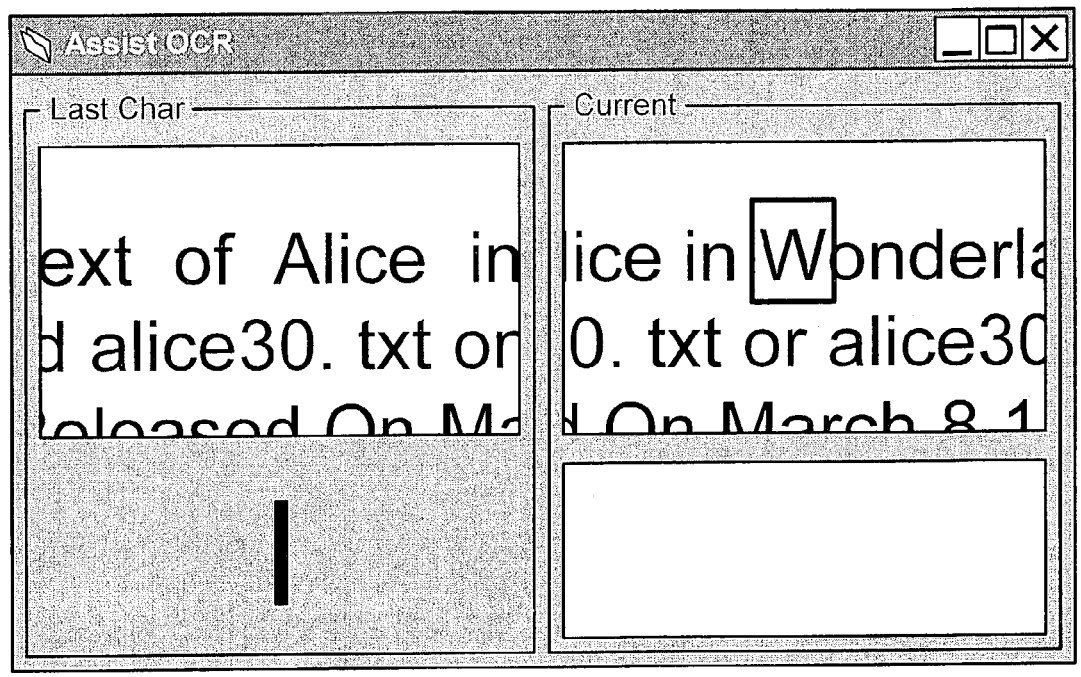
FIG. 3 shows an example of a screen that is presented to an operator during the text correction process in the system of FIG. 1.

When a block cannot be classified, a human operator is automatically consulted. The block appears on their screen, highlighted so the user knows exactly what is being asked about. The operator types in the letter in question. This value is provided back to the classifier. FIG. 3 shows an example of operator consultation screen. Here the system is asking about the W of "Wonderland" on the right side. The last character asked about was the l of "Alice", which appears of the left side. The last character is presented in case the user makes a mistake, so they can press the delete key to 'go back' and change their responses. The operator presses the key corresponding to the letter in the block presented. If a block that represents more than one letter is presented the operator may press the escape key to enter in a longer textual string followed by the enter key. If a block that does not represent a valid letter is presented the operator can press the escape key twice, or can press the escape key followed by the enter key.

Once the value of the block has been determined, whether by automatic classification or by human consultation, the block image and its value are recorded in the system's dictionary of known blocks. The process is then repeated with the next block. When all blocks have been classified, the document is sent to another queue for document finishing.

Although identified lines are defined at a relatively early stage of the process, at that time the process is susceptible to skew in the image; if a line was slanted downwards it could, in error, be merged with the next line. Now that the identity of most of the letters is known, their base lines can be approximated based on the typographical properties of the letters. For example the base line for "a" is at the bottom of the block, the base line for "g" is approximately in the middle of the block and the base line for a double quote (") could be taken as 1 average block height below its bottom. The top-left block is taken and a cluster of base lines is identified within ½ of an average character height of this block's base line. Once such a cluster is identified, the best-fit line is found and the line having characters whose base lines are within ½ an average character height of the line is chosen. In this way, the process is made less susceptible to skew in the line detection and so is made more robust. As regards spaces, these are identified between words by looking at the x co-ordinates of the letters. When a gap of more than twice the average consecutive letter gap occurs that is called a space.

As a final stage, ambiguous blocks are resolved to the best character. Where the determination is whether a block is upper or lower case, the block's size and positioning can be considered. Known blocks are used to determine what are the appropriate sizes. Letter positioning is used on the line to determine between a comma and a single quote. To determine between X and x, V and v, Z and z, S and s, C and c, their sizes are checked to see whether they are more similar to the sizes of unambiguously lower-case letters like a, e, n, r or more similar to the size of unambiguously known upper case letters like A, E, N, R. The same tool is used to determine which blocks are a lower case o out of a lower case o, an upper case O and the number 0. To determine between an upper case O and the number 0, the character's neighbours are identified to look for unambiguously known numbers or letters. Numbers are found by context, as numbers tend to appear with other numbers or can stand alone in between two spaces. A lower case I is determined by the proximity of a dot above it (in case the dot was not joined to the bottom of the "i"). An upper case "I" is distinguished from a lower case l by saying it is an upper case I if it follows punctuation requiring a capital, if it stands alone in between two spaces or follows a known capital letter, otherwise it is a lower case L.

To detect mistakes both in the original document and in the recognition process, the final text is fed through a spell check engine. Words that are not known are fed to a human operator, who is presented with the image and the recognised text. The operator verifies the text in a similar application to the above. As with conventional spell check systems, a list of suggested corrections is shown for selection. The recognised text is displayed with both recognised capitalization and in block capitals so as to assist operator recognition of mis-recognition of ambiguous letters. The corrected or approved word is then added to the list of known good words in a word dictionary.

When a correction is made, a test is conducted to see if a letter was mis-recognised outside of the classification groups. If this is the case, the operator is consulted to see whether the mistake was in the original document or introduced by the system. In the latter case, the problem letter is deleted from the list of known good letters and is put in a special database for review by administrators to determine the nature of the problem, as we do not expect or accept this type of error. This completes the process for detecting errors in the originally scanned document and the text is now sent to an output file in the format requested by the original user. If any pictures were detected that should be saved those are also added. Depending on the format requested, formatting may be applied to try to match the original document. The current implementation produces text output only, suitable for indexing for full text retrieval.

The fully checked, corrected and formatted file is then returned to the user, by whatever method was requested, for instance, e-mail. The user sees the scanning of a document and the quick return of a highly accurate text document (speed may be dependent on the quality of service requested e.g. service could be cheaper if the user will accept it some time in the next week, being more expensive for immediate processing). Accuracy is comparable to a professional typist, though the system is able to process documents much faster and without the need for highly skilled typists, so at lower cost. This is advantageous.

As will be appreciated, over time use of the previously described system will cause the build up of a massive dictionary of known character images. In time, it would become computationally expensive to compare each trial image against all of the images in the dictionary. Instead, it would be advantageous to consider only the relevant subset of the dictionary. To do this a new algorithm has been devised.

The essential problem is the identification of elements from a set of points in a high-dimensional space closest to an arbitrary given point in the same space. Here the set is the dictionary of known points and the arbitrary point is the unknown block image. Conventional algorithms largely fall into two groups: those based on partitioning space along a single axis at a time and those based on finding clusters and using a single image to represent the cluster. Those based on partitioning along one dimension at a time are of little use here because of the very small influence of individual pixels on the total score. The problem with clustering algorithms is that they tend to be computationally expensive and do not seek to provide optimal clusters.

To overcome at least some of the problems with conventional algorithms, a new and simple clustering algorithm is proposed. To visualise, imagine the 256 dimensional space in Euclidean terms as a square (ie consider the case of 2 dimensions). When it is empty and the first letter is learned, a point (image) is added to the square. A circle is then constructed around that point. If another point is added, there are two cases: (1) it lies in one of the existing circles (2) it does not lie within any existing circle. If it does not, it is added as a new point at the centre of a new circle. It should be noted that these circles may, indeed probably will, overlap. If the point lies within an existing circle, it is inserted into a second square associated with the circle comprising only of additional points within that circle. The original point at the circle centre is not added to the associated child-square. Circles are built into that associated square according to the same method, but with half the radius of the circle in the square one layer above in the tree. In this way, each circle segments the space and the further the tree is descended the more granular the segmentation becomes. For instance, at the top level one circle may contain tall thin letters like I, l, ! etc; another round full ones like a, o, e, @ etc. But of course as this segmentation is automatic and unguided, as the space is developed, more and more subtle characteristics can be differentiated.

In practice, each square is an object. The radius of the circles in that square is a property of that square object. Another property of each square object is a list of circles. Each circle comprises the representative image/central image that originally produced the circle and a pointer to a child-square, which may be null. To add an image, the distance to each of the circle centres is determined. If an image is not within the radius of any of the circles, another circle is added by adding another point to the list of circles with a null sub-square pointer. If an image is within a circle(s), the circle with the smallest distance is selected and the new image is added to the associated sub-square for that circle. If the pointer was null, a new sub-square is created first, which new sub-square is initially empty and contains circles of half the radius of circles in the parent.

This data structure can be implemented using linked lists. There is no need to store the circle radius as it can be calculated dynamically as the data structure is traversed, by merely adding a 'next peer pointer' and a 'child list' pointer to each image.

Figure 4:
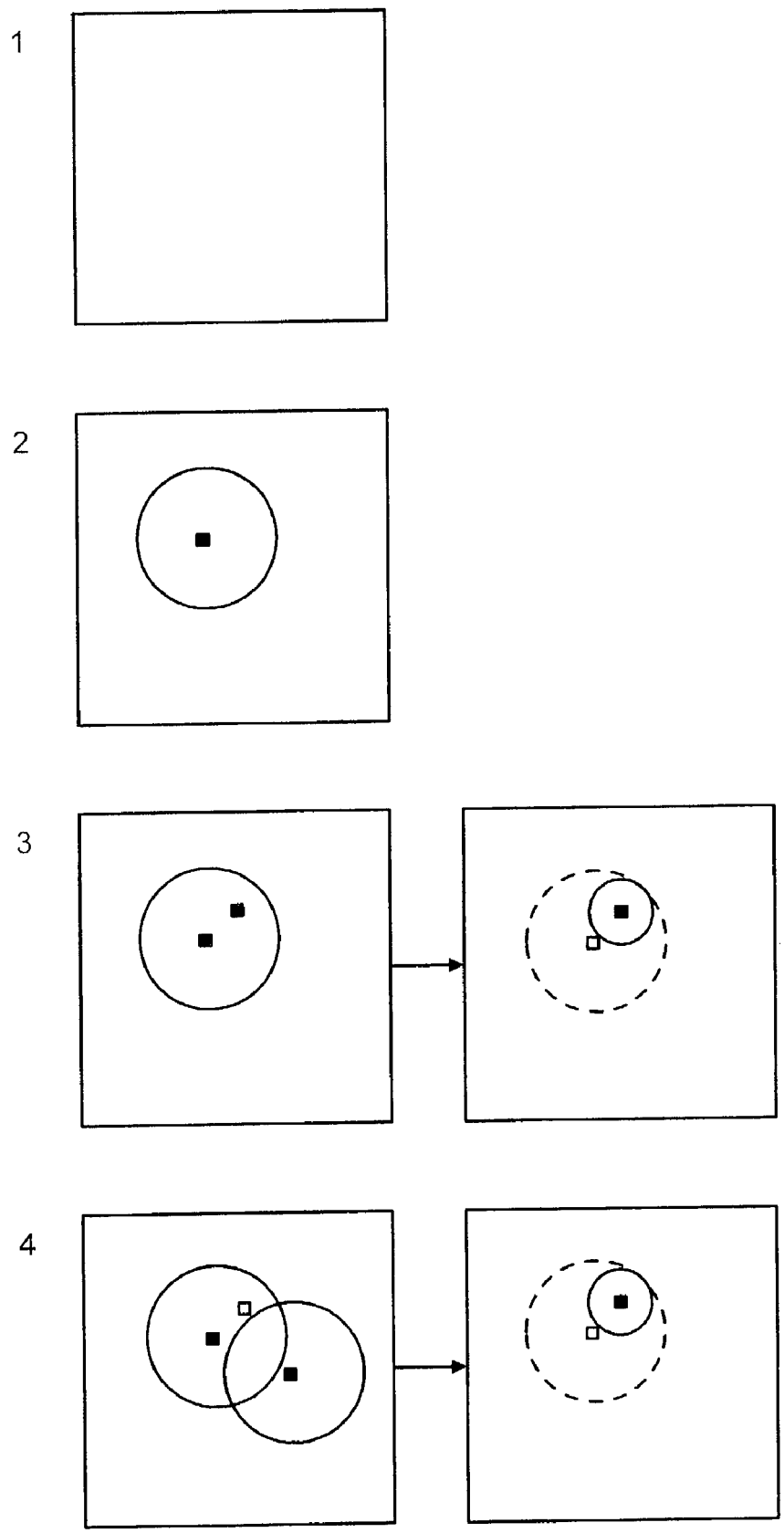
FIG. 4 shows further steps taken in the process of error correction for the system of FIG. 1.
Figure 4:
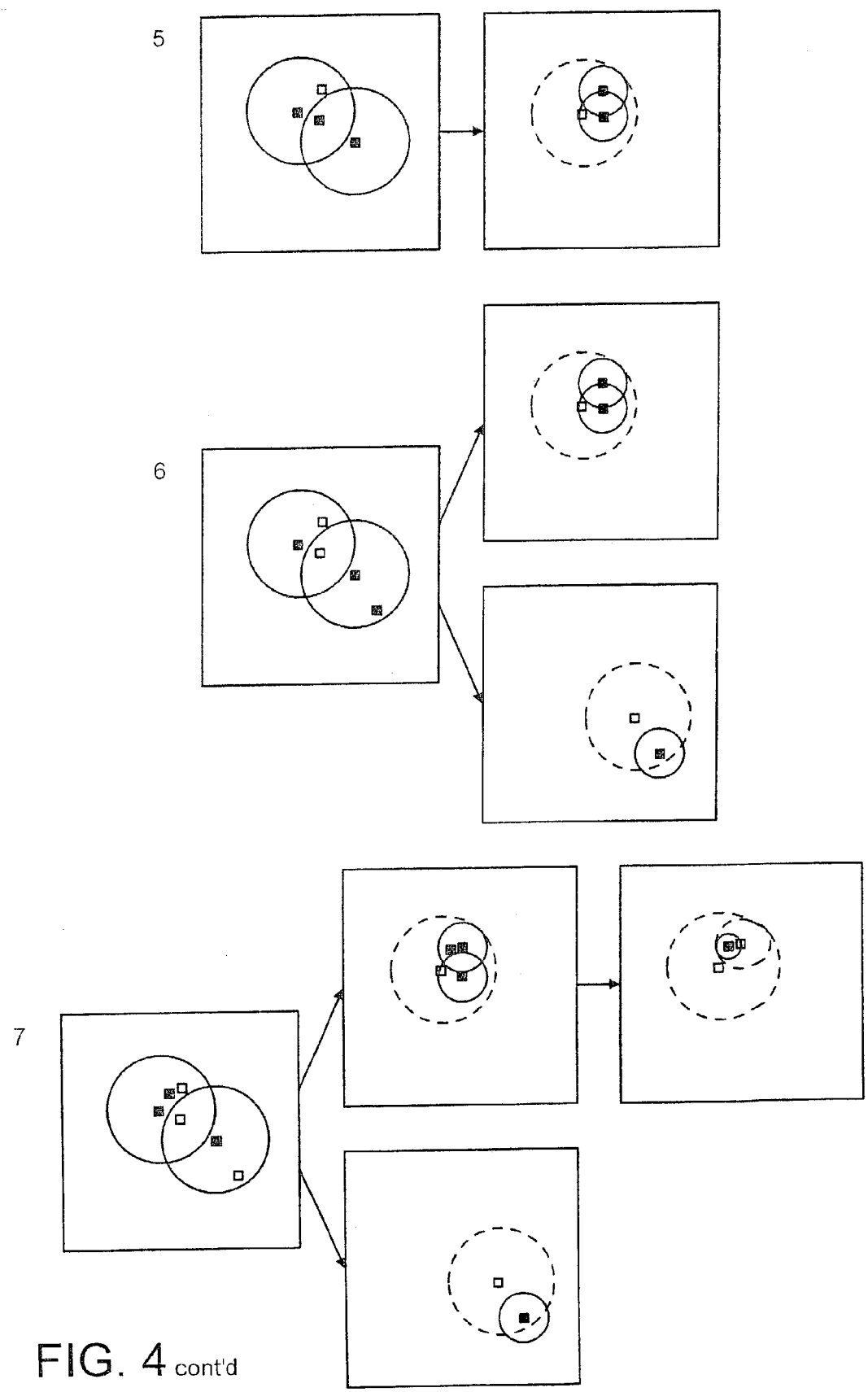

FIG. 4 shows the evolution of the data structure. At step 1 the initial square exists and is empty. In step 2, the first point is added and is not in any existing circle, so a new circle is created. The associated square for the new circle is not yet created. In step 3, another point is added, which falls within the existing circle. The new associated square is now created and the point added to this square. This point is outside of existing circles in that sub-square, so a new, smaller sub-circle is created. It should be noted that the size of the smaller circle is not critical, but for convenience, it is preferably set to be half the size of the first circle. In step 4, another point is added, which falls outside existing circles in the top layer, so a new circle is added at the top level. In step 5, a new point is added which falls into both circles but is closer to the first circle's center, so the point is added to the associated sub square. In adding the point to the sub-square, the point falls outside of existing circles, so a new (smaller) circle is created at this level. In step 6, a new point is added which falls into an existing top-level circle without a sub-square, so as in step 3 a new sub-square is created and the point added to it. In step 7, a new point is added which falls into the first circle at the top level, so must be added to the sub-square associate with that circle. When adding to that sub-square the point falls into an existing circle so again a sub-square must be created and the point added to that sub-square. There are no existing circles in that sub-sub-square, so a new circle is created, with half the circle radius of the parent's radius.

Figure 5:
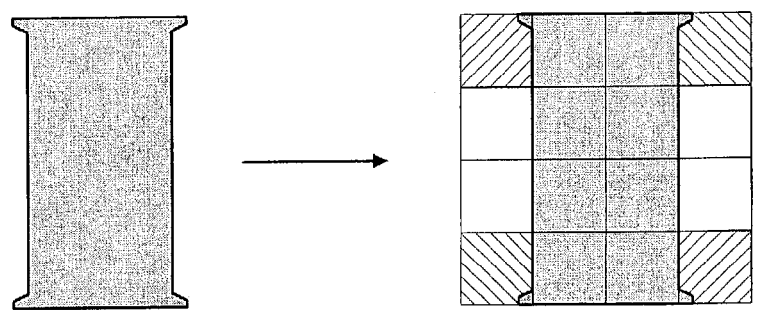
FIG. 5 shows the letter "T" scaled into a 4 by 4 grid, such scaling being used in the system of FIG. 1.

As a more specific example, consider the process steps required to identify the letter I. The first step is to normalise the letter shape to fit into a pre-determined grid. This is shown in FIG. 5, where the letter scanned is scaled into a 4 by 4 grid having 16 boxes and a colour density for each box is determined and put in an appropriate position in a 16 dimensional vector. In the present case, the letter I could be represented (for example) by the following vector:

(0.1, 0.9, 0.9, 0.1, 0, 0.9, 0.9, 0, 0, 0.9, 0.9, 0, 0.1, 0.9, 0.9, 0.1)

This vector corresponds to a point in 16 dimensional space. This point can then be compared to points already entered in the system dictionary to determine the most likely match.

For simplicity, the exemplary method described above is two dimensional, but this can be broadened to higher dimensions, for example three, in which case the squares referred to above would be replaced by boxes and the circles would be replaced by spheres. The rest of the method will be described with reference to boxes and spheres, in order to encompass higher dimensional cases.

In order to determine a match for an image block, it is necessary to find the image block from the dictionary that has the lowest distance and the next-best image from among competing letters. Consider firstly the simpler task of finding the letter with the lowest distance. This is done by calculating the distance of the point to each of the sphere centres at that level. Each of the spheres is then considered in ascending order of distance. This search can be stopped when the closest point found so far is closer than any other point could be and still be in one the remaining spheres. A sphere is too far away to be considered if the point's distance to the sphere is greater than the radius of the sphere plus the distance to the best point yet. By sorting the distances to the centres, the best match can be found quickly. If a sphere is not too far away, the comparison is done recursively in the sub-box associated with that sphere.

In order to find the letter with the lowest distance and the runner up, the best distance found must be increased by the factor of the pre-determined ratio (e.g. square root of 2) when deciding whether to descend into a sphere. This is because it is necessary to find the best runner up if it is within the ratio of the best image. This system works well at cutting out searches in distant areas of the dictionary, thereby speeding up the process.

In the method described above, a sphere is defined as being homogenous if all the images within it belong to the same recognition group, by which is it generally meant groupings of upper and lower case letters, such as V and v or P and p, although also includes groupings such as O, o and 0. A sphere is categorised as being strongly homogenous if (1) it is homogenous, (2) all points in the entire dictionary that lie within the ratio times the sphere size of the sphere centre have the same value as that sphere. When a point lies within a strongly homogenous sphere, it will pass the ratio test and will have the value of the sphere, so it is given a score equal to the sphere ratio, a value equal to the homogenous value and the search is stopped immediately.

The introduction of the concept of homogenous spheres makes the addition of points to the dictionary more complex as it is necessary to record and maintain whether spheres are strongly homogenous. When a newly taught image is added, a search similar to that of the point comparison algorithm is performed, but instead of looking only at the nearest sphere the system software is adapted to search for strongly homogenous spheres that the new point 'breaks'. The search descends into spheres to determine if there could be such a sphere within it; this could be the case only if the distance to the centre of the sphere is less than [(radius of the current sphere)+(radius of a child sphere*ratio)] (the homogenous child sphere could be on the edge of the main sphere). When a strongly homogenous sphere is found, the search does not descend into it, but instead it is assumed that it is densely populated and checked to see whether it has been "broken". A strongly homogenous sphere has been "broken" when the closest point or strongly homogenous sphere of different value found in the search was within the ratio of the radius of the sphere. It is possible to deduce where to add the new image as part of this descent of the tree.

As regards adding points as part of the learning process, in the case of strongly homogenous spheres these points are not actually added to the spheres, but instead are put on a 'pending list'. If a value is to be added to the structure that causes a strongly homogenous sphere to cease to be strongly homogenous then this destructive value is firstly added, then all the values from the pending list. Most of these values actually go on to the pending lists of strongly homogenous sub-spheres.

Image addition with homogenous spheres is therefore slightly more complex than without, but it is worthwhile as it is expected that relatively few characters will be added compared to the number being compared and the need to compare with every image is eliminated. In addition, image addition can be done on a separate machine and need not be done in real-time. It could be done overnight to add the day's new images.

A hybrid solution presents the ideal implementation. A master dictionary is maintained with a complete history using homogenous spheres (here it takes a long time to add images, but retrieval is efficient). Also maintained is a separate dictionary without homogenous spheres to record the new images since the last batch (images can be added quickly, but it is necessary that potentially every image is accessible). In the classification stage, images are compared separately against both dictionaries and then the best matches are taken.

Also important are the problems of what happens when a human operator makes a mistake on a character. While hopefully this will be detected by the final checks, it is important that this does not corrupt the master database of known points in the meantime. To limit such problems, in the classification stage a subset of the known dictionary that comprises the relevant best points from the dictionary for each letter is found. Thus for each image it has the nearest image and the best runner up. This sub-dictionary is sufficient for running the comparison. Indeed, it is sufficient only to record the distances to and value of these best images. As each of these sub-dictionaries is generated, the document with the sub-dictionary is assigned to a human operator's machine. The machine runs the classification algorithm on this reduced dictionary and trained letters are initially recorded in the reduced dictionary. The human operator's machine runs a simple, brute force version of the algorithm which does not use the sophisticated data structure as the number of letters it manages is small (only those that the operator trains). It is now easy to implement the 'undo' functionality. Only after the document has been completed is the master dictionary updated to 'learn' the new characters as taught to it by the operator. As images are learnt, on the human operator machine the software goes back over previously recognised images to see whether the new image has broken the ratio test for any of the previously 'recognised' images. If so, these images can then also be prompted.

Human operators find it much easier to type a word than they do a series of randomly selected single letters. Hence, the operator software looks for a cluster of blocks, so that the entire word can be prompted, and thus deduces the value of several blocks from that word. If the number of blocks is less than the number of characters then there must be a block comprising more than one letter. If the number of blocks is greater than the number of characters then there must be a block that is not really a letter or two blocks for one letter. The software could then ask about each of these blocks in sequence, or pick another cluster of blocks if one exists. The software would also avoid picking words where the blocks are not similar in positions and dimensionality, as this could be a sign of a block mis-recognition.

Heuristics on typing speed and probability of block mis-recognition are used to evaluate the decision on whether to ask for a word or ask for an individual block, using statistics collected by dynamically and automatically monitoring the actions of the operator. The software also sometimes "gives up" if that is considered worthwhile and will simply ask the operator to type an entire line/paragraph/document when its heuristics indicate that will be faster.

The system described so far enables images that are scanned into a user terminal to be quickly and efficiently converted to text for the user with very high accuracy. The system can however additionally or alternatively be used to allow text that is spoken into voice recognition equipment to be corrected or to create a voice interface where the end system responds to spoken natural language commands. In the case of voice recognition the electronic version of the spoken word is checked for accuracy, corrected and then returned to the user. In the case of the voice interface, however, the electronic version of the spoken word is checked for accuracy, corrected and interpreted to determine what the user wanted, i.e. the intent of the spoken word. Once the intent is determined, a command signal can be sent to the user's terminal to carry out that intent. It will be appreciated that the voice interface uses the same features as the simpler voice recognition system, but with the addition of sending command signal that represent a user intent to the user terminal.

Figure 6:
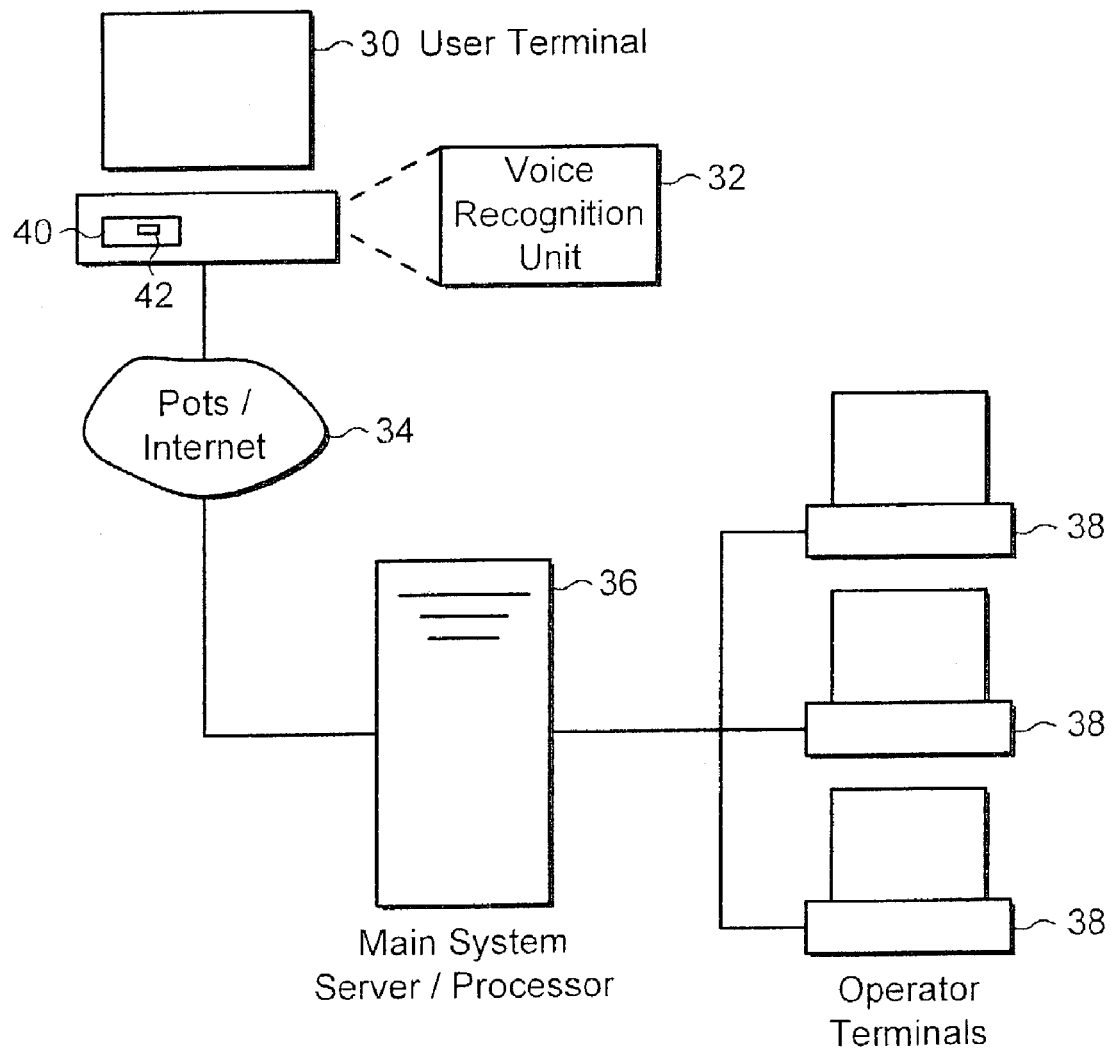
FIG. 6 is a block diagram of a second system, in which text is spoken into voice recognition software and then submitted to a central server at a remote location for error correction.

FIG. 6 shows a user terminal 30 that has a voice interface equipment 32 that is operable to receive the spoken word and translate it into an electronic format. A commercial off the shelf application for voice recognition could be used; indeed most that run under Windows conform to the Microsoft Speech API, so they are reasonably interchangeable. In this way, some preliminary stages of the voice recognition are done on the local machine. In a preferred embodiment, the sound is also recorded. Typically, this audio file will be of low quality, being intended to be only of sufficient quality for a human operator to understand the speech. However, a sophisticated implementation may also involve the (possibly deferred) transmission of high-quality versions of the audio file, so that the voice interface service builds up a database of speech recordings and the recognized text for use in training and development of VR engines etc. Alternatively, the end-user's terminal 30 could merely be used as a telephone, indeed it may in fact be a telephone/mobile phone, or audio recorder and the voice recognition software could be provided at a remote location.

As before, the user terminal 30 is connected via the internet or any other suitable communication system 34, for example a dedicated secure connection, to a main server(s) 36, which is in turn connected to a plurality of operator terminals 38 that are manned by trained staff. Included in a processor 40 in the user terminal 30 is a client application 42, which is software that is operable to interpret incoming signals from the voice interface equipment and automatically transmit the signal and potentially preliminary text over the communication network to the main server. Alternatively, the spoken text may be transmitted directly to the main system server. The client application 42 may fulfil other functions that will be described in more detail later.

Included in the main server are one or more service processors having software for receiving, interpreting and correcting the incoming information from the user terminal. Sound recordings of the spoken phrase may also be received. Also included in the main server is software for transmitting selected signals to a selected one of the manned operator terminals for manual interpretation assistance by the operator.

Figure 7:
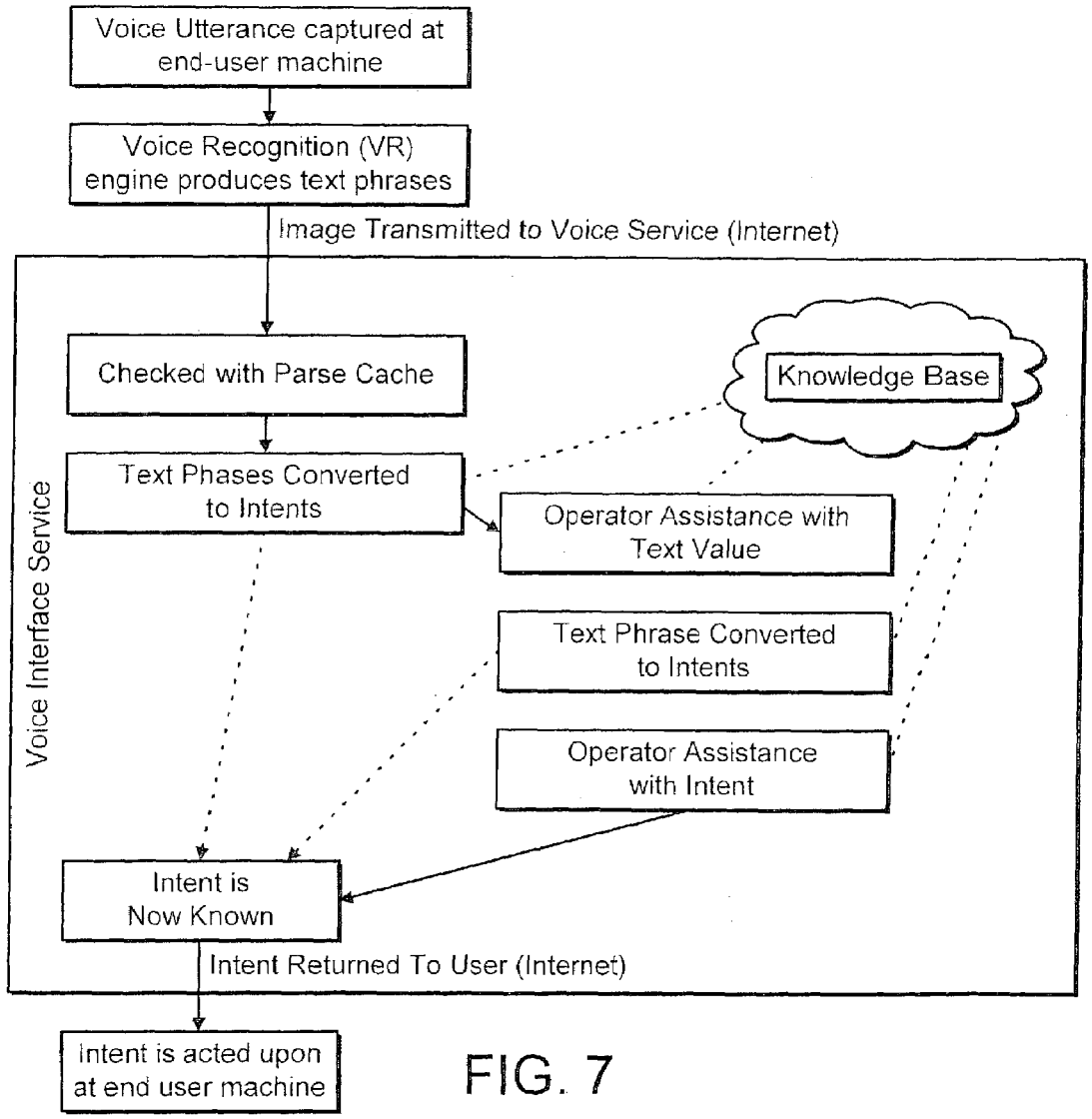
FIG. 7 shows process steps for using the system of FIG. 6.

The process steps for using the system of FIG. 6 as a voice interface for carrying out a user intent are shown in FIG. 7. The process begins when the end-user says something at their machine. The end-user's machine and the voice recognition/interface service must collectively recognize that the user has said something and determine what has been said. The process of voice recognition is thus standard. The software detects when the user is speaking (usually by looking at the volume level—it may be fooled by loud background noise). When the application is informed by the voice recognition package that an utterance has been detected, the software asks the voice recognition engine for its recognized text phrases. A request packet is then generated, the request comprising the best guesses of the voice recognition engine as to what was said, with some indications of their likelihood and also an audio file of the utterance.

Once the request is generated, it is automatically and transparently transmitted over the internet or other communications network, ideally using a standard protocol such as FTP or HTTP, to the voice recognition/interface main server, along with identification of the client (for billing and data return purposes, as well as to track user identity and information). The end-user software would ideally take the form of an easily downloadable application or Java applet or ActiveX control, if the VR engine is already installed.

The requests received are placed into a queue for processing at the voice recognition/interface service provider. Their queue entry is recorded in a database. Multiple queues could allow different quality of services. The best guesses of the voice recognition engine as to what was said are evaluated against an information database(s). The information database (s) is built up over time, by recording personal details or preferences from what has been said, or from information directly entered into the system by the user. For example, software may be provided to allow users to verbally enter personal details, such as the names of their children or their favorite sport or their mother's telephone number etc. Non-personal information (such as weather reports or stock prices) may be directly fed into the information database by system operators.

As described in the present embodiment, the information database is stored in the main server. However, the information database could in fact be stored at the user's terminal. In this case, when the user's voice recognition software has interpreted the utterances, the information database is searched for words that are similar to or the same as those interpreted. If anything is identified, a message is sent with the interpreted voice signal to the server identifying the word from the information database and providing an indication as to its meaning and the confidence of that interpretation. An advantage of having the information database at the user's terminal is that the privacy of the user can be maintained.

When each utterance is received at the server, it is evaluated into a set of possible requests that the user may have actually meant. A combined likelihood for each possible request is heuristically calculated. In the current implementation, this is based on a combination of:
- the likelihood from the voice recognition engine that the text was actually what was said
- the likelihood from the service's knowledge base that the request was what was meant given what was said
- an estimation from the user's information base of which intents are likely.

For example, suppose the user says "How's Tokyo doing?". The voice recognition engine might have detected this and have outputted the following two possible recognitions, with roughly equal probabilities:
 How's Tokyo doing?
 How's Toto doing? (Toto could be the user's dog)
The knowledge base might interpret "How's Tokyo doing" as a request for the status of the Tokyo production line, the weather in Tokyo or where the Nikeii is trading. These might be, hypothetically, roughly equally likely. The interpretation of "How's Toto doing" might be strongly recognised as a request for the status of the operator's pet dog Toto. The single utterance was expanded to two possibilities for text, which were expanded to four possible intentions.

Ambiguities are resolved when the system evaluates the likelihood that the user really is asking each of those things. For instance, if the user does not have a dog called Toto (or at least hasn't told the system about it), they're unlikely to be referring to it. Contextual information such as this is captured as the user interacts with the system, in much the same way as interactions work in real life. If the user has never referred to their dog before, they are likely to introduce it in some way when first using in conversation. When they do not, and the system responds incorrectly or not at all, then the user may clarify their initial request and then the contextual information may be captured. A user who asks about their dog ten times a day might be considered very likely to be referring to it. Someone who is not involved in financial markets is unlikely to be asking about the Nikeii. The history of what people have asked is heuristically used to assist in scoring the possible intents.

In this way, a set of possible interpretations for the utterance are scored for likelihood. Once this is done, a heuristic is adopted, which is able to differentiate between those interpretations that have a high probability of being correct and those that do not. The heuristic used is a combination acceptance heuristic that accepts interpretations where the interpretation's score is better than a minimum threshold and the ratio of the best to the second-best score is greater than a set ratio threshold.

Where the utterances have failed to meet the pre-determined criteria for automatic acceptance, these are sent to a human operator. The utterance (via the transmitted signal of the speech) is then re-played to the operator, who begins by choosing the correct textual interpretation from the list produced by the voice recognition engine. If the voice recognition engine did not correctly recognise the text, the operator types in the correct text. This system could also use a voice interface, where the operator speaks the number of the correct text (from the list of suggested alternatives) or instead speaks the correct text for recognition by a conventional voice recognition system, this being easier for the operators. By using high-quality audio microphones, cutting down on background noise and training these local voice recognition systems for the operator's voice the accuracy of these systems can achieve high accuracy.

The ideal implementation offers a hybrid system where the operator can speak, click or type as they find fastest and easiest in each case. This speeds the process up. The operator may also invoke exception handling. To do this, the software may be such as to allow them to indicate that the utterance was not a real utterance and should be ignored (e.g. if the system picked up background noise), or can instruct the system to apologise and ask the user to repeat their request (if the request is unintelligible).

Once the text is corrected, it is recorded in the service's knowledge database and will be passed back to the end-user's machine with the final response. The corrected text will then be passed to the voice recognition engine at the end-user's machine, so that the voice recognition engine may 'tune' itself to what is being said if it is so able. Thus the voice recognition engine's accuracy increases as it is used. Traditional training (where the user must read a set passage) may be foregone by using the voice recognition engine out of the box, accepting that the initial accuracy will be low. The operator correction of the spoken utterances will be used heavily during this initial period, until the voice recognition engine becomes tuned to the user's voice. This system alone, with its use of third party training of the voice recognition system, is a large improvement on current voice recognition systems.

Now that the text has been deduced, the interpretation process begins again, though only with the correct text. Because the algorithm is now only considering one textual phrase with a much higher confidence, it may now be possible automatically to deduce the user's intent with a higher degree of accuracy, but using the same heuristics.

In cases where it is not possible automatically to deduce what the user wanted to do despite knowing what they said, the message is sent to a second human operator. This operator may be chosen from a different bank of operators, as their role is more complicated than that of the 'level-one' operators. This human operator hears the utterance as it was said by the user and sees the recognised text. If the recognised text is not correct then the operator can hit an exception button to send the text back for re typing. An alternative arrangement could reduce the burden on the first-level operators by sending those utterances where the voice recognition engine was reasonably confident about the text, but there was ambiguity as to its meaning, directly to this second level. Where the voice recognition engine was wrong as to the text, the second level operators would return it to the first level. However, the relatively skilled nature of the second-level operators means that this is not the preferred implementation.

The human operator now 'teaches' the system what this utterance means. At this stage, possibly with the aid of human intervention, the correct intention has been deduced. The system now returns the correct intention, (along with the correct text for training of the voice recognition engine), to the client system.

The correct utterance text and the correct intention are stored in the knowledge base. This is an immediate advantage of the current system, in that valuable information on how systems are used in the real world is captured. This information is used internally by the system, but will probably also have many other uses. For instance, the information may be used to figure out which tasks users have difficulty with and offer them help with these tasks or redesign the way they work and in designing other systems.

The client system now performs the correct intention. The exact way in which the system looks and responds depends on the nature of the system being operated. Where the system is a Windows personal computer, a conventional application such as Microsoft Word may be driven via OLE Automation, for instance, so the return intention may be formatted as a sequence of OLE automation calls and the feedback is given by the application visibly responding. The user terminal could however be a domestic appliance, in which case, the appliance may either speak back or perform some action (e.g. start the spin cycle) or both. Here the response could be a series of phonemes to be spoken and a command as to the state to enter (start rinse, cook toast, start heating).

Where the client system comprises a master computer that performs the speech recognition and manages the submission to the voice interface system, but the action is performed on some other device, there are various possibilities. For instance, a toaster may not have its own voice recognition system, but would accept commands from the master computer to start toasting. The master computer would then be set up to listen to commands in the various rooms of a house and direct the commands appropriately so the user could control their devices without needing to install a voice recognition engine and audio system on each one.

One difficulty lies in the various different possibilities for the intentions, eg controlling a PC application is very different from controlling a toaster. Different applications may find different preferred representations of their universe and of intentions. A highly sophisticated representation system is described herein, so that one skilled in the art will have no difficulty in building a simpler version if they feel it is more appropriate for a particular application.

In order that the knowledge base should be as broadly applicable as possible, it is desirable to come up with some universal generalisations that apply across all desired fields. Hence, an abstract model of the world to be controlled is constructed and the intention against this model is sent to the client, which acts upon it in an appropriate way, which may even be client specific. For instance, if a user asks their phone if they have any e-mail, the system may reply with a brief summary of the new messages. If the user asks their television/computer the user's inbox may also be displayed. Both responses would be generated by the abstract intention of "query for message objects that have not yet been read". The decision of how to perform the intention, ie display messages or read them, is taken at the client layer or potentially at a server performing the role of the client for a dumb terminal such as a phone.

If the application is one that manages e-mails and contacts, the main objects in the abstract universe are mail messages, people, e-mail addresses, phone numbers and addresses. A representation system could understand just these objects, but would then be hard to extend. The representation system can be implemented highly generically by introducing the idea that objects are nothing but a store of data values. Thus an e-mail message could involve the following data values.

| ObjectType: | Email |
| ObjectType: | Message |
| Sender: | Pointer to "Justin" person object |
| Recipient: | Pointer to "Alice" person object |
| Recipient: | Pointer to "Ben" person object |
| Recipient: | Pointer to "Charlotte" person object |

-continued

| Recipient: | Pointer to "David" person object |
| SubjectLine: | Hello All |
| Body: | (Text that comprises the message.) |
| MessageRead: | False |

The referenced objects may be as follows:

Justin object:

| ObjectType: | Person |
| ObjectType: | Contact |
| PhoneNumber: | Pointer to "123-4567" phone number object |
| Address: | Pointer to "1 Some Street" address object |
| Address: | Pointer to "1 Work Street" address object |
| Email: | Pointer to "justin@justin.com" email object |

Ben object:

| ObjectType: | Person |
| ObjectType: | Contact |
| Email: | Pointer to "ben@ben.com" email object |
| 123-4567 | |
| Phone number object | |

| ObjectType: | Phone Number |
| Country Code: | (the numeric value) 44 |
| Area Code: | (the numeric value) 207 |
| Phone Number | (the numeric value) 1234567 |

Etc

The information is thus stored in a highly free-form manner. Data values are not required etc, and multiple data values are possible, including multiple object types. Properties do not need to be predefined. It is simple to map this to a relational database by putting all values in one single table with columns of ObjectID, Property Name, Value. More efficient implementations are possible with object-based databases or custom-built database systems.

The query is therefore specified as follows. The utterance "show me my new messages" is mapped to a query for objects which have an "ObjectType" of "Message", and "MessageRead" of False.

This highly free-form system can be extended as follows, to attempt to normalize the objects. The system allows for the programming of rules, such as: an object which has ObjectType of Email also has an object type of Message (i.e. all emails are messages). Or: an object with an ObjectType of "Contact" also has an object type of "Person" (all contacts are people). In this way the system remains highly generic. These rules allow the intention rules to remain simple: rather than the intentions embodying the implicit values in the database the database contains them explicitly. These rules are introduced in advance and periodically by 'third level' operators, or knowledge engineers, based on analysis of the queries that are conducted in the field or in beta testing of new applications. Analysis may also be driven by failures to communicate successfully with the system, which can be detected by the user saying 'no' or 'cancel' or some other phrase which means "Undo" or "Wrong". The user may also be provided with an 'Undo' function in their user interface (eg a special key on their phone or keyboard).

When an operator receives a phrase to be translated into intentions, they begin by translating sub-phrases. They define actions for the sub-phrases and then go to bigger portions of the text phrase and define how the sub-actions for the sub-phrases combine to form the total action. The default recognition for each sub-phrase is shown, so operators do not have to redefine already correctly recognised portions.

The automatic recognition process method is to consider every sub-phrase from the sentence in order of increasing length. This begins by mapping to intentions all sub-phrases of length one (ie the individual words). Next all sub-phrases of length two are considered and an attempt is made also to map them to known intentions. A mapping of a phrase to an intention may include mappings of its constituent parts: hence dynamic programming is necessary for efficiency. This process is continued and increasingly longer sub-phrases are considered until a set of possible intentions is determined for the whole phrase. Confidences are heuristically calculated for each possible intention, by considering the mapping rules used and their 'success' in the history. Where a rule has always held, there is more confidence in applying it than when applying a rule to which there are numerous direct counter-examples. This is the second of the three scores that are combined to give the final score. The rule confidences are calculated periodically based on analysis of the knowledge base.

As an example, consider the following utterances and their translations:

User says: "Show me incoming messages"

Translation:
The phrase "Show me" is taught as a display query for the sub-phrase which comprises the rest of the sentence (ie "Show me x"->SELECT(x)).
The phrase "messages" is taught as a restriction to those objects with ObjectType Message (by a rule, this will include Email messages and voice messages and will include other messages whose types we do not yet know of but may later be introduced to the system such as faxes). This may be represented as WHERE (ObjectType='Message').
The phrase "incoming" is taught as a restriction to those messages sent to the current user. This may be represented as WHERE(Recipient=@@CURRENTUSER)
The phrase "x y" is defined as the intersection of the values for "x" and for "y"; here this applies to "incoming messages" ie AND(WHERE (Recipient=@@CURRENTUSER), WHERE (ObjectType='Message'))
The phrase "Show me incoming messages" is now recognized as SELECT(AND(WHERE (Recipient=@@CURRENTUSER), WHERE (ObjectType='Message')))

The @@CURRENTUSER is one of set of conversational state variables that allow a certain degree of abstraction as to the conversation. Variables may contain the current subject of discussion, current query etc. This is how the thread of a conversation can be followed despite translating on a per-phrase basis. As with object properties, variable multiple values may be assigned different confidences, the ambiguity hopefully being resolved by the intention scoring process.

Note that the operator may have defined "incoming messages" directly, instead of through sub-phrases. Operators may end up defining it both ways, so there may be interpretations for "incoming messages" as well as for "incoming" and for "messages" and their combination, but this is not a problem as the system will consider both interpretations. So long as both map to the same query the system will accept the intention. If they map to different queries the ratio test ought to catch this problem. Of course, ideally the operator would define "incoming" and "messages" separately so that it is then less work for the operator if the user says "Show me incoming email".

As another example, consider the following utterances and their translations:

User says: "Show me incoming email"

Translation:
The phrases "show me" and "incoming" are known, the default values are displayed.
The phrase email is highlighted as being unknown; the operator defines it as WHERE(ObjectType='Email').
The phrase can now be recognised and successfully mapped to a query of the abstract model.

User says: "Do I have any incoming messages"

Translation:
The phrase "incoming messages" is known, the phrase "Do I have any" (and its subphrases) are unknown.
The phrase "Do I have any" is taught as a query on the existence of items in the subphrase which comprises the rest of the sentence ie "Do I have any x"->EXISTS(x)
The phrase can now be recognized.

User says: "Show me messages from Jim"

Translation:
The phrase "Show me" and "messages" are known. The phrase "from Jim" is unknown, may be defined as follows:
"from x"->"WHERE(Sender IN x)
"x" is mapped to WHERE(Name="x"). This is a special rule in the system, and is typically built in. This rule is only resolved if such an object exists (a hash-table can be used, or the Name property may be special in the database eg an indexed field). Where the information database is stored on the user's machine an indication of whether such an object exists is transmitted for each recognised word.
The phrase can now be recognised. The IN operator in the first query which is needed as there may be several Jims known to the system, is managed automatically—it may be typed as=.

Note that the system can now understand queries such as "Do I have any incoming messages from Mary?", "Show me incoming messages from Bill." Etc. The explosion of understood commands means that human interaction is needed less and less often. The 80/20 rule-of-thumb, 80% of commands used in practice coming from a subset comprising only 20% of 'possible' commands helps us in this regard.

The combination of an abstract model and the highly generic parsing method, allows the system to perform much better than conventional methods and does not require pre-planning in building the parse tree. Conventional parsing is designed to produce a single outcome; the method here presented produces a large number of possible outcomes from which the best are selected and it is also decided whether there is confidence in the interpretation.

The information database may be used to help in determining which of the interpretations is correct. For instance, when asked to display something, the correct query is much more likely to have some values than to have none. If the user asks for the date of Toto's last flea vaccination, it is much more likely that they are referring to Toto the dog, rather than Toto the restaurant or Tokyo the city, which the VR engine may have suggested as a possible hearing. The database has flea vaccination information for Toto but not for the others, so the score for the canine interpretation may be raised. In this way the system 'knows' about the real world and can resolve ambiguities in many difficult sentences. This is part of the third factor in the score. For speed, this factor is only evaluated when necessary.

To increase the speed of the parsing method a cache of recognised commands is constructed. Each time the system is asked to parse a string, it checks the cache first. If it is found then the parsing process is not used, but if it is not found the system proceeds with the parse. The cache can be generalised. For instance, suppose the following requests are received:

Show me messages from Ben
Show me messages from Charlotte
Show me messages from Ben sent in the past month
Show me messages from Ben sent in the past two weeks
Show me messages sent in the past two weeks from Ben
Show me my messages from Alice The following rules could be stored in the cache:
Show me messages from OBJECT-NAME
Show me messages from OBJECT-NAME sent in the past TIME-PERIOD
Show me messages sent in the past TIME-PERIOD from OBJECT-NAME
Show me my messages from OBJECT-NAME It can immediately be seen that building a true parse tree could represent these items more efficiently by combining them using multi-level rules, but the compromise is acceptable for the simplicity and speed of the cache.

Data value recognition (eg TIME-PERIOD) is done by programming the system with recognition rules. If data values are not recognized then the cache is not as effective but this does not affect recognition accuracy, only cache efficiency and thus speed. An advantage of this cache is that checking to see whether an object is in the cache can be done very quickly by constructing a hash code for each sentence to see whether it is in the cache. Initially all words are checked to see if they are recognised data values or recognised object names, and if so replaced with the appropriate code (OBJECT-NAME or TIME-PERIOD or NUMBER or DATE etc). A hash-code is then constructed for the sentence using a standard method and this can be looked up in a hash-table that contains the cached parses. This hash-table need not be stored in memory, but can instead be stored on slower (cheaper) mass-storage, as only one read is done per utterance.

As information is added to the system, the cache may contain information that is invalid. To get round this a timestamp is stored in the cache and the oldest items in the cache are routinely re-processed. Those that are no longer automatically interpreted in the same way are removed from the cache so that the next time they are requested they will be reinterpreted. The monitoring of items whose meaning changes can also reveal problems in the system to the 'third-level' operators. Such problems arise if an operator makes a mistake in specifying an intention, for instance. The set of items whose values are changing reveals the areas of the system most in need of review. The 'third-level' operators may wish to remove or edit troublesome rules, or reduce their confidence.

The automatic full parse method also uses a cache of interpreted sub-phrases to speed recognition of sub-phrases. Thus the sub-phrase 'incoming messages' will be cached, again using a hash-table implementation. This changes the way the algorithm runs, as instead of building from the shortest sub-phrases up, the whole phrase is now checked and then sub-phrases, using memoisation to simulate dynamic programming (in practice this memoisation may be combined with the cache). The nature of the algorithm is not altered by the shift in implementation style.

An alternative interpretation technique may involve parsing the text into an intermediate conventional parse-tree representation, and then interpreting this parse tree. The same novel techniques as above can be applied. The techniques could also be applied separately to each stage.

The system in which the invention is embodied has many advantages. Whilst it is described above in connection with an OCR system and a voice interface, it will be appreciated that the basic principles can be applied to various situations. For example, the system could be adapted to be used to produce accurate translations of text from one language into another. In addition, the system could be adapted to interpret facts in what are called expert systems.

Expert systems attempt to distil the knowledge of an expert, such as a doctor or car mechanic, and produce a (large) set of rules so that the computer can do the job of the expert. For instance, an expert system might have rules like "if you have a cold and a fever you probably have flu" in the medical domain. Or it may say things like "if your car doesn't make any noise when you turn the key, and the radio also doesn't work, then your battery is probably flat".

A typical expert system works by asking the user questions, and continuing to ask relevant questions, narrowing down the diagnosis until a conclusion of satisfactory confidence is reached. This is very simple to map into the framework of the system described above. To do this, standard questions are entered into the system database, together with likely answers. The user is then asked these questions. As long as the answers stay within the history, the user's questions can be answered and more questions from the history database asked. Once outside the area in which the system is able to ask appropriate questions, an expert (doctor/mechanic) is automatically consulted to provide further questions and to continue to do so until a diagnosis is reached. This question/answer to diagnosis path is recorded so that the next time someone with the same symptoms uses the system the expert will not be needed.

Based on the domain, the system can chose how strict to be in allowing differing responses to the questions. The more freedom that the user is allowed in responding to a question, the slower the system will learn. Against this, the field of medicine may require a lot more flexibility than computer technical support, given that the consequences of misdiagnosis are so much higher. An ideal application for this would be in computer technical support.

To enhance an existing or trivial transformation algorithm, 'weak' outputs are identified and diverted to an alternate system. Initially, the alternate system comprises human operators. Input/output pairs and generalizations thereof can be stored so as to reduce the fraction of diverted cases that require human intervention by not repeatedly asking humans to process the same or similar inputs.

Good conventional algorithms recognize the majority of inputs the majority of the time. The conventional way to enhance an algorithm is to refine or redevelop it to attempt to boost the percentage of correct outputs. The system in which the invention is embodied uses an algorithm and diverts that portion of inputs where the majority of errors are produced to operators, thereby eliminating the majority of mistakes and increasing accuracy on a case by case basis. This is advantageous. Nevertheless, errors can remain because operators may make mistakes and because the algorithm may misclassify the output as being definitely right when it is, in fact, wrong. For accuracy, selection of an algorithm (or its parameters) for this method is based on minimizing these 'false positives'. This is a different optimisation from that in conventional algorithm improvement. For example, an algorithm that can only classify 75% of values, but is 99% accurate is now preferable to one that classifies 99% of values but is only 75% accurate. For the former, the system will divert the unknown 25%, thereby achieving 99.25% accuracy (assuming the operators to have 100% accuracy). For the latter only 1% can be diverted, giving the system 75.25% accuracy.

The system can chose between user/service based on hardware and communications links. In practice, knowledge bases and operator stages may be combined. More advanced selection criteria for operator assistance may be used, eg picking n worst in system at present (where n is based on number of operators working) or picking based on quality of service guarantees.

A significant advantage of the invention is that the algorithm can be taught as the system develops. This learning can take several forms:

- Automatically learning correct responses to diverted outputs to reduce the requirement for operator assistance by 'never asking the same question twice'
- Automatically tweaking the algorithm so far as it permits
- Providing the algorithm with a larger data set for methods that look at history (eg Bayesian-based methods)
- Collection of the data set allows domain experts to design new algorithms, add features to or overhaul the basic (unenhanced) algorithm.

The system in which the invention is embodied has many advantages, many of which are derived from the intelligent interaction with the operators. For example, the accuracy is high and the system is intelligent to the extent that user is able to interact naturally. Mistakes are hidden from the user. The operator assistance is hidden from the user. In addition, the system has the capability to change the relationship between user and machine by dynamically up-dating, for example, the knowledge base. A further advantage is that there is no need for initial development of a complex or impossible algorithm and vast data set. Instead, the system databases are developed on an 'as needed' basis. In addition, it is possible to collect data about how users use the system and the algorithm's weaknesses. This is valuable 'in the field' data, which is currently not collected.

A skilled person will appreciate that variations of the disclosed arrangements are possible without departing from the invention. Accordingly, the above description of several embodiments is made by way of example and not for the purposes of limitation. It will be clear to the skilled person that minor modifications can be made without significant changes to the operation described above.

What is claimed is:

1. An interpretation system comprising:
   means for receiving an electronic signal via a telecommunications system from a user terminal;
   processing means for interpreting the signal electronically;
   means for identifying a part or parts of The signal that cannot be accurately interpreted by the processing means;
   means for presenting at an operator terminal, distinct from the user terminal, the part of the signal that cannot be accurately interpreted by the processing means;
   means for allowing the operator to interpret at least said part of signal,
   means for sending a further signal including the interpretation of the signal to the user terminal or another predetermined electronic destination, and
   means for automatically adapting the processing means when operator assisted interpretation is employed, so that the processing means is able to interpret signals that are identified by the operator, thereby to extend the range of signals that can be accurately interpreted electronically.

2. A user terminal adapted for use with an interpretation system comprising:
   means for receiving an electronic signal via a telecommunications system from a user terminal;
   processing means for interpreting the signal electronically;
   means for identifying a part or parts of the signal that cannot be accurately interpreted by the processing means;
   means for presenting at an operator terminal, distinct from the user terminal, the part of the signal that cannot be accurately interpreted by the processing means;
   means for allowing the operator to interpret at least said part of signal, and
   means for sending a further signal including the interpretation of the signal to the user terminal or another predetermined electronic destination.

3. The system of claim 1, wherein the means for interpreting the signal comprise means for cleaning up an included image to remove unwanted marks.

4. The system of claim 1, wherein the means for interpreting comprise means for identifying a block, preferably a single character, within an included image.

5. The system as claimed in claim 4, wherein means are provided for comparing the block with known blocks already stored in a library, thereby to identify the block.

6. The system as claimed in claim 4, wherein, in the event that a block cannot be identified, the means for presenting are configured to display at the operator terminal the unidentified block either alone or as part of a sequence of blocks, so that the operator is able to identify the block.

7. The system as claimed in claim 1, wherein the means for interpreting comprise means for identifying a block, preferably a single character, within an included image; wherein, in the event that a block cannot be identified, the means for presenting are configured to display at the operator terminal the unidentified block either alone or as part of a sequence of blocks, so that the operator is able to identify the block and wherein the means for processing include a library of known blocks and means are provided for adding to the library any block that is identified by the operator, so that the library is dynamically up-dated.

8. The system of claim 1, wherein the signal includes text is derived from an electronic scanner that is operable to scan text documents and provide an electronic version of the text.

9. The system of claim 1, wherein the signal includes text captured from a keyboard located at the user terminal.

10. The system of claim 1, wherein the signal includes text is derived from voice recognition software that is operable to convert spoken words into electronic text.

11. The system as claimed in claim 10, wherein recording means are provided for receiving and including an audio version of the spoken phase in the signal.

12. The system as claimed in claim 11, wherein the operator terminal is adapted to play back at least a part of the audio recording to allow the operator to hear what was said; thereby assisting the operator in interpretation of the signal.

13. The system of claim 1, wherein the interpretation includes a command operable to control equipment distinct from the user terminal, at the user location, such as domestic appliances.

14. A method of interpreting electronic signals comprising:
   receiving the electronic signal via a telecommunications system from a user terminal;
   processing the signal electronically to interpret it;
   identifying parts of the signal text that cannot be accurately interpreted electronically;

presenting at an operator terminal, distinct from the user terminal, the part of the signal text that cannot be accurately interpreted electronically;

correcting errors in the presented signal interpretation by allowing human intervention, sending a further signal including the interpretation to the user terminal or another pre-determined electronic destination, and automatically adapting the electronic signal-interpretation process when operator assisted interpretation is employed, so as to extend the range of signals that can be accurately interpreted electronically.

15. A method as claimed in claim 14, wherein interpreting the signal involves cleaning up an included image to remove unwanted marks.

16. A method as claimed in claim 14, wherein interpreting the signal involves identifying a block, preferably a single character, within an included image.

17. A method as claimed in claim 16, comprising comparing the block with known blocks already stored in a library, thereby to identify the block.

18. A method as claimed in claim 14, wherein, in the event that a block cannot be identified, the step of presenting includes displaying at the operator terminal the unidentified block either alone or as part of a sequence of blocks, so that the operator is able to identify the block.

19. A method as claimed in claim 18, comprising adding to the library of known blocks any block that is identified by the operator, so that the library is dynamically up-dated.

20. A method as claimed in claim 14, wherein the signal includes text derived from an electronic scanner that is operable to scan documents and provide an electronic version of the text.

21. A method as claimed in claim 14, wherein the signal includes text captured from a keyboard located at the user terminal.

22. A method as claimed in claim 14, wherein the signal includes text derived from voice recognition software that is operable to convert spoken words into electronic text.

23. A method as claimed in claim 14, wherein the signal includes an audio version of the spoken phrase.

24. A method as claimed in claim 23, comprising playing back at least a part of the audio recording to allow the operator to hear what was said, thereby assisting the operator in interpretation of the signal.

25. A method as claimed in claim 14, wherein the interpretation includes a command operable to control equipment distinct from the user terminal, at the user location, such as domestic appliances.

26. A computer program, on a computer readable medium, for controlling a method of interpreting electronic signals, the computer program comprising instructions for:

receiving the electronic signal via a telecommunications system from a user terminal;

processing the signal electronically to interpret it;

identifying parts of the signal that cannot be accurately interpreted electronically;

presenting at an operator terminal the part of the signal that cannot be accurately interpreted electronically;

correcting errors in the text presented signal interpretation by allowing human intervention;

sending a further signal including the interpretation to the user terminal or another pre-determined electronic destination, and automatically adapting the electronic signal-interpretation process when operator assisted interpretation is employed, so as to extend the range of signals that can be accurately interpreted electronically.

27. A method of interpreting electronic signals consisting of natural language text or signals derived from voice interface equipment operable to convert spoken words into electronic format comprising:

receiving electronic signals via a telecommunications systems from at least one user terminal;

electronically processing the signals to interpret them with respect to the user's intent;

identifying at least one part of the signals that cannot be accurately interpreted electronically;

presenting at an operator terminal, distinct from the user terminal, the said at least one part for human operator interpretation;

receiving a corrected interpretation of the presented part as a result of said human operator interpretation;

sending signals comprising at least the corrected interpretation to the originating user terminal or another predetermined electronic destination, distinct from the operator terminal, and automatically adapting said electronic signal-interpretation processing in response to said operator intervention so as to extend the range of signals that can be accurately interpreted electronically.

28. A method as claimed in claim 27, wherein the step of electronically processing involves identifying a phrase or sub-phrase and comparing the phrase or sub-phrase with known phrases or sub-phrases already stored in a knowledge base thereby to interpret the phrase or sub-phrase.

29. A method as claimed in claim 28, wherein, in the event that a phrase or sub-phrase cannot be interpreted, the step of processing includes presenting at the operator terminal said phrase or sub-phrase either alone or as part of a sequence of phrases or sub-phrases, so that the operator is able to interpret the phrase or sub-phrase.

30. A method as claimed in claim 29, comprising adding to the library of known phrases or sub-phases any phrase or sub-phrase that is identified by the operator, so that the knowledge base is dynamically updated.

31. A method as claimed in claim 27, wherein the signals include an audio version of a spoken phrase.

32. A method according to claim 27, wherein the telecommunications system comprises at least one of a communication network and the Internet, and/or wherein the sending step comprises sending the corrected interpretation of each said at least one part together with the parts of the signal that can be accurately interpreted electronically.

33. A computer program on a computer readable medium, the computer program comprising instructions for interpreting electronic signals using the method according to claim 27.

* * * * *